US011815698B2

(12) United States Patent
Hou et al.

(10) Patent No.: US 11,815,698 B2
(45) Date of Patent: Nov. 14, 2023

(54) LASER COMBINING APPARATUS AND DISPLAY DEVICE

(71) Applicant: Appotronics Corporation Limited, Shenzhen (CN)

(72) Inventors: Haixiong Hou, Shenzhen (CN); Fei Hu, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 530 days.

(21) Appl. No.: 16/962,960

(22) PCT Filed: Mar. 28, 2018

(86) PCT No.: PCT/CN2018/080895
§ 371 (c)(1),
(2) Date: Mar. 10, 2021

(87) PCT Pub. No.: WO2019/144495
PCT Pub. Date: Aug. 1, 2019

(65) Prior Publication Data
US 2021/0278683 A1 Sep. 9, 2021

(30) Foreign Application Priority Data
Jan. 25, 2018 (CN) .......................... 201810073060.4

(51) Int. Cl.
*G02B 27/14* (2006.01)
*G02B 19/00* (2006.01)
(52) U.S. Cl.
CPC ......... *G02B 27/14* (2013.01); *G02B 19/0019* (2013.01); *G02B 19/0047* (2013.01)
(58) Field of Classification Search
CPC .............. G02B 27/14; G02B 19/0019; G02B 19/0047; G02B 19/0057; G02B 27/106;
(Continued)

(56) References Cited

U.S. PATENT DOCUMENTS 6,377,410 B1 * 4/2002 Wang .................... G02B 27/09
372/75
8,690,343 B2 * 4/2014 Tanaka ................. G03B 21/204
353/38
(Continued)

FOREIGN PATENT DOCUMENTS

CN 1417638 A 5/2003
CN 1782862 A 6/2006
(Continued)

OTHER PUBLICATIONS

International Search Report dated Oct. 22, 2018, Application No. PCT/CN2018/080895.
(Continued)

*Primary Examiner* — Magda Cruz
(74) *Attorney, Agent, or Firm* — The Dobrusin Law Firm, PC

(57) ABSTRACT

Provided are a laser combining apparatus and a display device. The laser combining apparatus includes a first group of light sources including first light source arrays, a second group of light sources including second light source arrays, a reflection apparatus including first and second reflection strips, a light converging apparatus and a light collection apparatus. Each first reflection strip reflects light emitted from at least one first light source array, each second reflection strip reflects light emitted from at least one second light source array, and light emitted from each first reflection strip and light emitted from each second reflection strip are also guided to the light converging apparatus. The light converging apparatus converges the light emitted from the first reflection strips and the second reflection strips to the light collection apparatus. The light collection apparatus collects the light converged by the light converging apparatus and then emitting same.

18 Claims, 13 Drawing Sheets

(58) Field of Classification Search
CPC ............ G03B 21/2033; G03B 21/2066; G03B 21/208; G03B 21/2013; G03B 21/2073
See application file for complete search history.

(56) References Cited

U.S. PATENT DOCUMENTS

| | | | | |
|---|---|---|---|---|
| 2009/0141242 | A1* | 6/2009 | Silverstein | G03B 21/2013 353/8 |
| 2010/0328633 | A1* | 12/2010 | Sato | G02B 19/0066 362/235 |
| 2012/0133903 | A1 | 5/2012 | Tanaka | |
| 2013/0162956 | A1* | 6/2013 | Okuda | G03B 21/2013 353/30 |
| 2014/0085888 | A1* | 3/2014 | Svensen | G03B 21/2066 362/247 |
| 2014/0293232 | A1 | 10/2014 | Tanaka | |
| 2016/0085143 | A1* | 3/2016 | Hu | G02B 3/0006 362/231 |
| 2016/0091783 | A1* | 3/2016 | Hu | F21V 13/04 362/235 |
| 2017/0176845 | A1* | 6/2017 | Ogino | F21V 29/70 |
| 2018/0074392 | A1* | 3/2018 | Akiyama | G03B 21/2066 |
| 2022/0082918 | A1* | 3/2022 | Weng | G02B 19/0019 |

FOREIGN PATENT DOCUMENTS

| | | | | |
|---|---|---|---|---|
| CN | 101878655 | A | | 11/2010 |
| CN | 102734659 | A | | 10/2012 |
| CN | 202629628 | U | | 12/2012 |
| CN | 103186019 | A | | 7/2013 |
| CN | 103186025 | A | | 7/2013 |
| CN | 103207509 | A | | 7/2013 |
| CN | 103412457 | A | | 11/2013 |
| CN | 104049445 | A | | 9/2014 |
| CN | 204575981 | U | | 8/2015 |
| CN | 204575981 | U | * 8/2015 | ............ G02B 27/10 |
| CN | 104914659 | A | | 9/2015 |
| CN | 104937488 | A | | 9/2015 |
| CN | 105446064 | A | | 3/2016 |
| CN | 105487236 | A | | 4/2016 |
| CN | 106873298 | A | | 6/2017 |
| CN | 206421144 | U | | 8/2017 |
| CN | 207318919 | U | | 5/2018 |
| WO | 2016209367 | A1 | | 12/2016 |
| WO | 2017/129467 | A1 | | 8/2017 |
| WO | WO-2017129467 | A1 | * 8/2017 | ............... H04N 9/31 |

OTHER PUBLICATIONS

European Extended Search Report dated Sep. 30, 2021, Application No. 18902126.4.

Chinese First Office Action & First Search dated Sep. 14, 2021, Application No. 201810073060.4.

* cited by examiner

LASER COMBINING APPARATUS AND DISPLAY DEVICE

TECHNICAL FIELD

The present disclosure relates to a laser light combining device and a display apparatus.

BACKGROUND

At present, laser light sources are increasingly used in display (such as the projection field) and lighting fields, and due to advantages of high energy density and small etendue, the laser light sources have gradually replaced bulbs and LED light sources in the field of high-brightness light sources. It is well known to those skilled in the art that brightness of an output light beam is positively related to power of laser light, and currently, laser arrays having low power are usually used to achieve high brightness requirements, which requires combining light beams emitted by various lasers.

SUMMARY

However, the existing laser light combining device have a relatively large size, which is not conducive to subsequent optical path processing and layout of an internal structure of a whole machine, especially for new laser combinations (such as a MCP laser array with four-dimensional array arrangement), and it is even more difficult to apply the existing laser light combining apparatus, impossible to achieve small-size and high-brightness output, and it is necessary to improve.

In view of the above technical problems, it is necessary to provide a laser light combining device and a display apparatus that can improve the above problems.

A laser light combining device includes a first group of light sources, a second group of light sources, a reflecting device, a light condensing device and a light collecting device. The first group of light sources includes one or more first light source arrays, the second group of light sources includes one or more second light source arrays, and the reflecting device includes one or more first reflective stripes and one or more second reflective stripes. Each of the one or more first reflective stripes corresponds to at least one of the one or more first light source arrays and is located on an emission optical path of the at least one of the one or more first light source arrays and configured to reflect light emitted by the at least one of the one or more first light source arrays. Each of the one or more second reflective stripes corresponds to at least one of the one or more second light source arrays and is located on an emission optical path of the at least one of the one or more second light source arrays and configured to reflect light emitted by the at least one of the one or more second light source arrays. The light condensing device is configured to condense light emitted by the one or more first reflective stripes and light emitted by the one or more second reflective stripes to the light collecting device. The light collecting device is configured to collect light condensed by the light condensing device and then emit the collected light.

A display apparatus includes a laser light combining device, the laser light combining device includes a first group of light sources, a second group of light sources, a reflecting device, a light condensing device and a light collecting device, the first group of light sources includes one or more first light source arrays, the second group of light sources includes one or more second light source arrays, and the reflecting device includes one or more first reflective stripes and one or more second reflective stripes. Each of the one or more first reflective stripes corresponds to at least one of the one or more first light source arrays and is located on an emission optical path of the at least one of the one or more first light source arrays and configured to reflect light emitted by the at least one of the one or more first light source arrays. Each of the one or more second reflective stripes corresponds to at least one of the one or more second light source arrays and is located on an emission optical path of the at least one of the one or more second light source arrays and configured to reflect light emitted by the at least one of the one or more second light source arrays. The light condensing device is configured to condense light emitted by the one or more first reflective stripes and light emitted by the one or more second reflective stripes to the light collecting device. The light collecting device is configured to collect light condensed by the light condensing device and then emit the collected light.

Compared with the related art, in the laser light combining device and the display apparatus of the present disclosure, densely arranged parallel light beams are generated by the first group of light sources and the second group of light sources, the first reflective stripe and the second reflective stripe are used to adjust directions along which the parallel light beams are transmitted, and uniform laser light beams with high-brightness can be finally obtained through the light condensing device and the light collecting device. Since a plurality of the light beams emitted by each light source array is approximately parallel and densely arranged, using each first reflective stripe and each second reflective stripe to reflect the light emitted by one or more first light source arrays and reflect the light emitted by one or more second light source arrays can make the entire laser light combining device have a compact structure and a relatively small size on the basis of ensuring high-brightness output, and can also control the number of the first reflective stripes and the second reflective stripes to be within a relatively small range, thereby achieving technical effects such as simplified device structure and convenient assembly.

SYMBOL DESCRIPTION OF MAIN COMPONENTS

Figure 1:
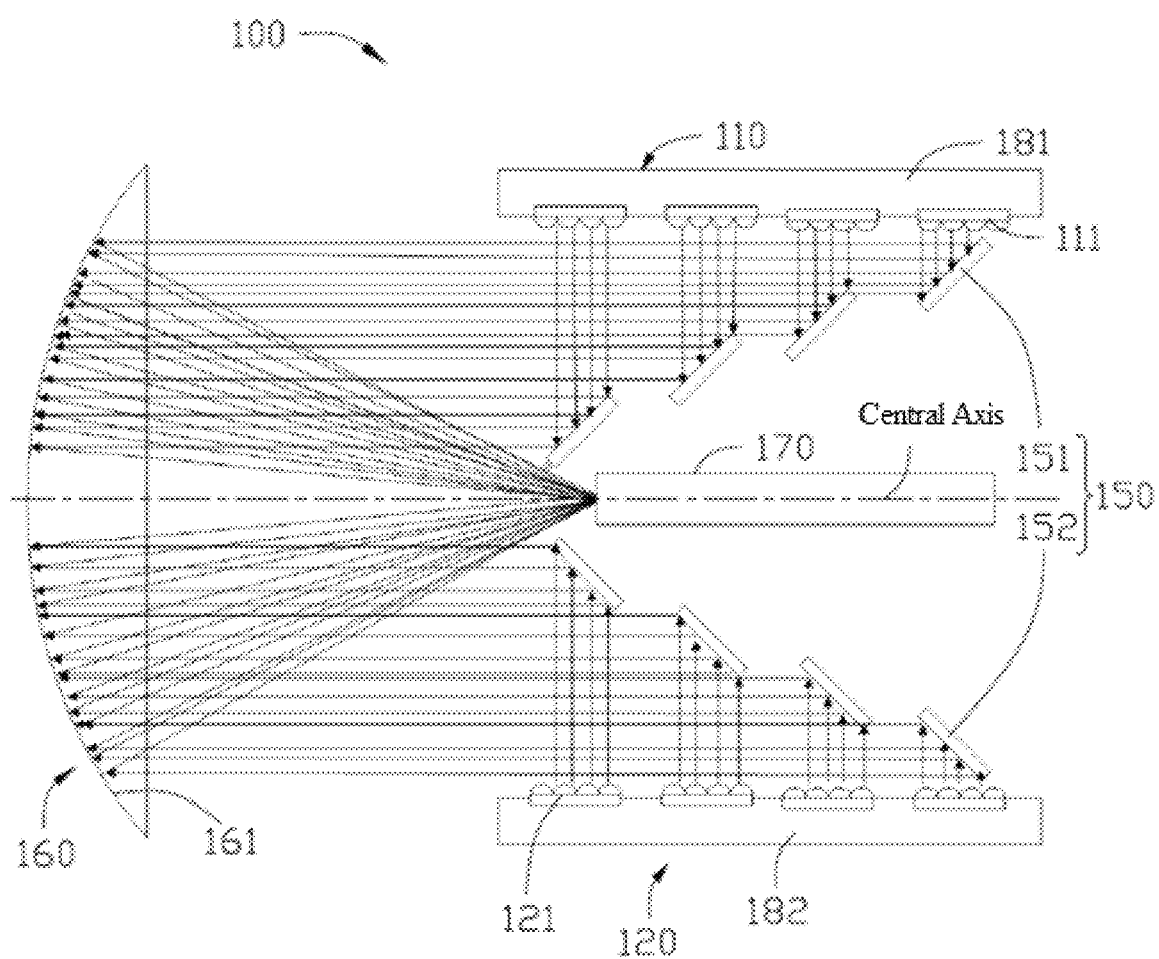
FIG. 1 is a schematic diagram of a laser light combining device according to a first embodiment of the present disclosure.

Laser light combining device 100, 200, 300, 400, 500, 600
First group of light sources 110, 210, 310, 410, 610
Second group of light sources 120, 220, 320, 420, 620
Reflecting device 150, 250, 350
Light condensing device 160, 260, 360, 460, 660
Light collecting device 170, 270, 370, 670
First light source array 111, 411, 511, 611
Second light source array 121, 421, 521, 621
First reflective stripe 151, 251, 451, 551, 651
Second reflective stripe 152, 252, 452, 552, 652
Laser light source array 101
Base body 102
Laser 103
Terminal 104
Water cooling plate 181, 182, 283, 284, 685
First connecting portion 155
Second connecting portion 156
Reflective curved surface 161, 261
Third group of light sources 230, 330
Fourth group of light sources 240, 340
Third reflective stripe 253
Fourth reflective stripe 254
Third light source array 231
Fourth light source array 241
Lens 362, 462, 562
First mirror 363, 463
Second mirror 364, 464
Light combining device 465, 565
First region 565a
Second region 565b The following specific embodiments will further illustrate the present disclosure with reference to the above drawings.

DESCRIPTION OF EMBODIMENTS

Referring to FIG. 1, FIG. 1 is a schematic view of a laser light combining device 100 according to a first embodiment of the present disclosure. The laser light combining device 100 includes a first group of light sources 110, a second group of light sources 120, a reflecting device 150, a light condensing device 160, and a light collecting device 170. The reflecting device 150 is configured to guide light emitted by the first group of light sources 110 and the second group of light sources 120 to the light condensing device 160, the light condensing device 160 is configured to condense light emitted by the reflecting device 150 to the light collecting device 170, and the light collecting device 170 is configured to collect light condensed by the light condensing device 160 and then emit it.

The first group of light sources 110 includes a first light source array 111, the second group of light sources 120 includes a second light source array 121, and the reflecting device 150 includes a first reflective stripe 151 and a second reflective stripe 152. Each first reflective stripe 151 corresponds to at least one first light source array 111 and is located on an emission optical path of the at least one first light source array 111, and each first reflective stripe 151 is configured to reflect light emitted by the at least one first light source array 111. Each second reflective stripe 152 corresponds to at least one second light source array 121 and is located on an emission optical path of the at least one second light source array 121, and each second reflective stripe 152 is configured to reflect the light emitted by the at least one second light source array 121. The light condensing device 160 is configured to condense the light emitted by the first reflective stripe 151 and the second reflective stripe 152 to the light collecting device 170.

Figure 2:
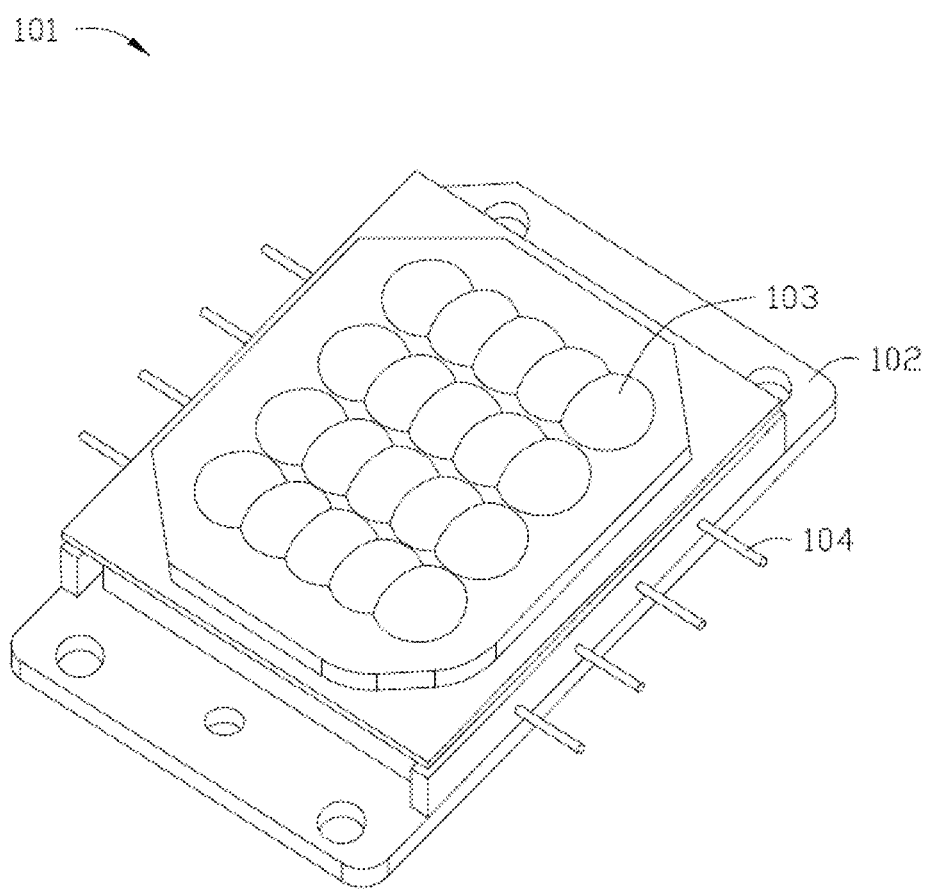
FIG. 2 is a schematic diagram of a laser light source array.

It can be understood that both the first light source array 111 and the second light source array 121 are laser light source arrays 101. FIG. 2 is a schematic view of the laser light source array. Referring to FIG. 2, the laser light source array 101 is an MCP laser array and includes a base body 102, a plurality of lasers 103 arranged in an array and on the base body 102, and a terminal 104 extending from the base body 102. The base body 102 can have conductive wiring inside, which is used to electrically connect the lasers 103 with terminals for electrically connecting to an external circuit. The plurality of the lasers 103 can be arranged in a 4*5 matrix, the lasers 103 located in a same row can be connected in series into one piece, there can be a small gap between two adjacent rows of lasers 103, and it can be understood that the interval can be set according to actual conditions.

The number of the first light source array 111 is plural, the number of the first reflective stripe 151 is also plural, the plurality of first light source arrays 111 are in one-to-one correspondence to the plurality of first reflective stripes 151, the plurality of first light source arrays 111 can be arranged along a straight line, and emission optical axes of the plurality of the first light source arrays 111 are staggered in parallel, the plurality of the first reflective stripes 151 are arranged in a staggered manner as seen along a direction perpendicular to the emission optical axis of the plurality of first light source arrays 111 so that spaces between light beams obtained after light emitted by the plurality of first light source arrays 111 is reflected are reduced, the plurality of first reflective stripes 151 reflects the light emitted by the first light source array 111 to combine light, and the light emitted by the plurality of first reflective stripes 151 is all guided to the light condensing device 160.

The number of the second light source array 121 is a plural, the number of the second reflective stripe 152 is also a plural, the plurality of second light source arrays 121 are in one-to-one correspondence to the plurality of second reflective stripes 152, the plurality of second light source arrays 121 can be arranged along a straight line, and emission optical axes of the plurality of second light source arrays 121 are staggered in parallel, the plurality of second reflective stripes 152 are arranged in a staggered manner as seen along a direction perpendicular to emission optical axes of the plurality of the second light source arrays 121 so that spaces between light beams obtained after light emitted by the plurality of the second light source arrays 121 is reflected are reduced, the plurality of second reflective stripes 152 reflects the light emitted by the second light source array 121 to combine light, and the light emitted by the plurality of second reflective stripes 152 is all guided to the light condensing device 160.

Further, the plurality of first reflective stripes 151 are sequentially arranged in a staggered manner as seen along the direction facing away from the light condensing device 160, and a distance between the first reflective stripe 151 and a corresponding first light source array 111 gradually decreases along the direction facing away from the light condensing device 160. The plurality of second reflective stripes 152 are sequentially arranged in a staggered manner as seen along the direction facing away from the light condensing device 160, and a distance between the second reflective stripe 152 and the corresponding second light source array 121 gradually decreases in the direction facing away from the light condensing device 160.

In the present embodiment, after being reflected by the first reflective stripe 151 and the second reflective stripe 152, the light emitted by the first light source array 111 and the second light source array 121 can have a substantially same direction and face towards the light condensing device 160, to facilitate the light condensing device 160 condensing the light emitted by the first light source array 111 and the second light source array 121. The light emitted by the first reflective stripe 151 and the second reflective stripe 152 are parallel to each other and all perpendicular to the emission optical axis of the first light source array 111 and the emission optical axis of the second light source array 121.

It can be understood that, in an embodiment, the lasers of the plurality of first light source arrays 111 can be disposed on a same base body, and the lasers of the plurality of second light source arrays 121 can be arranged on the same base body. In another embodiment, the plurality of first light source arrays 111 can be disposed on a same water cooling plate 181, to make heat dissipation effects of the plurality of first light source arrays 111 consistent, and then light emission brightness of the plurality of first light source arrays 111 is relatively consistent. The plurality of second light source arrays 121 can be arranged on the same water cooling plate 182, to make heat dissipation effects of the plurality of second light source arrays 121 consistent, and then light emission brightness of the plurality of second light source arrays 121 is relatively consistent, so that final light emission of the laser light combining device 100 is more uniform.

Further, as shown in FIG. 1, the plurality of first light source arrays 111 and the second light source arrays 121 can be oppositely arranged, that is, the first group of light sources 110 and the second group of light sources 120 are opposite to each other, the reflecting device 150 can be located between the first group of light sources 110 and the second group of light sources 120. Both the first reflective stripe 151 and the second reflective stripe 152 can be mirrors. A reflective surface of the first reflective stripe 151 and a reflective surface of the second reflective stripe 152 are both planar surfaces, and the reflective surface of the first reflective stripe 151 can be at an angle of 45 degrees to the emission optical axis of the first light source array 111, so that the light of the first light source array 111 reflected by the first reflective stripe 152 is approximately at an angle of 90 degrees to the emission optical axis of the first light source array 111. The reflective surface of the second reflective stripe 152 can be at an angle of 45 degrees to the emission optical axis of the second light source array 121, so that the light of the second light source array 121 reflected by the second reflective stripe 152 is substantially at an angle of 90 degrees to the emission optical axis of the second light source array 121. In the present embodiment, the first light source arrays 111 and the second light source arrays 121 are oppositely arranged in one-to-one correspondence, and light is emitted by the first light source arrays 111 along a direction opposite to a direction along which light is emitted by the second light source arrays 121.

Figure 3:
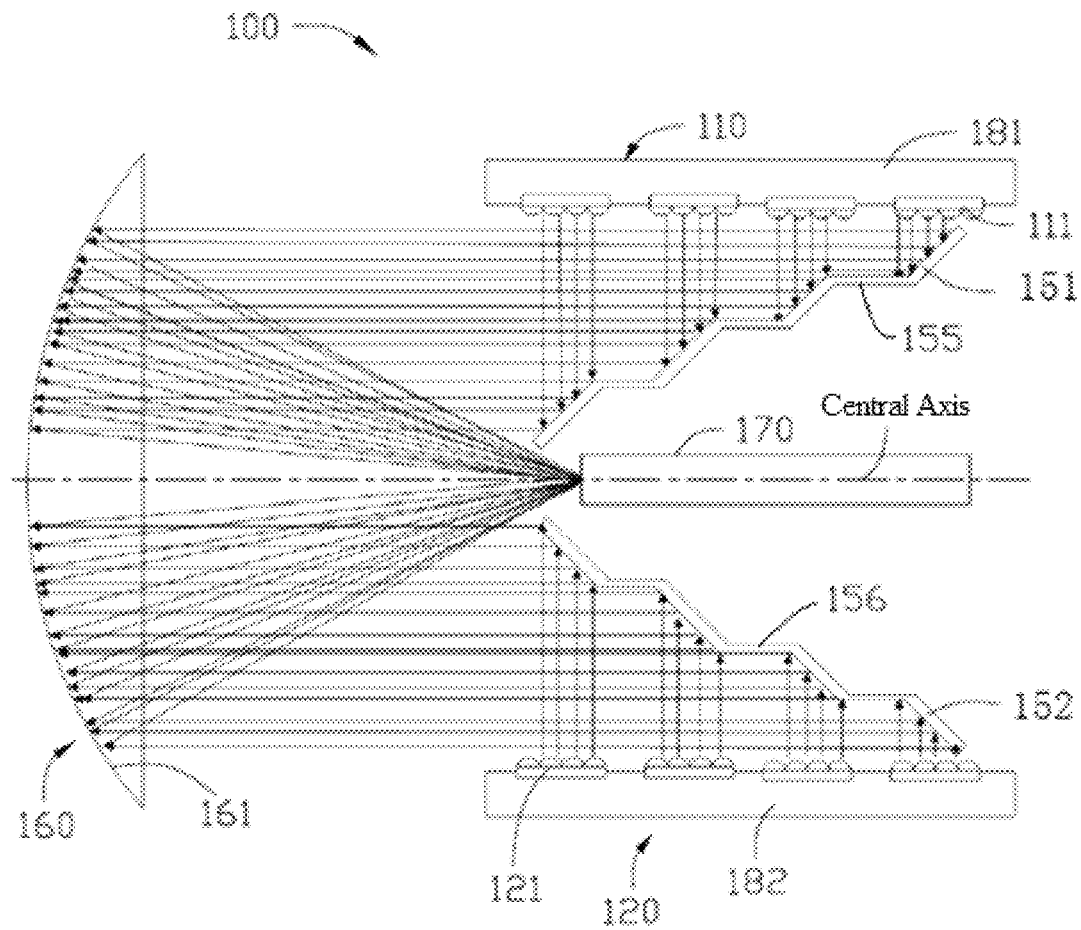
FIG. 3 is a schematic view of a modified embodiment of the laser light combining device shown in FIG. 1.

Further, as shown in FIG. 3, in a modified embodiment, at least two first reflective stripes 151 of the plurality of first reflective stripes 151 are connected into one piece through a first connecting portion 155, and a direction along which the first connecting portion 155 extends is parallel to a direction along which light is emitted by the first reflective stripe 151. At least two second reflective stripes 152 of the plurality of second reflective stripes 152 are connected into one piece by a second connecting portion 156, and a direction along which the second connecting portion 156 extends is parallel to a direction along which light is emitted by the second reflective stripe 152. It can be understood that it is convenient to assemble and fix the reflecting device in the modified embodiment.

The light condensing device 160 includes a reflective curved surface 161, the reflective curved surface 161 has a central axis, the light collecting device 170 is located on the central axis, and the reflective curved surface 161 is configured to condense the received light to an incidence surface of the light collecting device 170. A focal point of the reflective curved surface 161 can be located on the incidence surface of the light collecting device 170, the light collecting device 170 guides the light emitted from the reflective curved surface 161 to exit along a direction facing away from the reflective curved surface 161, that is, to exit along the direction of the central axis as a whole, and the respective reflective stripes (such as the first reflective stripe 151 and the second reflective stripe 152) are located at a periphery of the light collecting device 170, the respective groups of light sources (such as the first group of light sources 110 and the second group of light sources 120) are located at peripheries of the respective reflective stripes, specifically, the first reflective stripe 151 is located at a side of the light collecting device 170, the second reflective stripe 152 is located at a side of the light collecting device 170 facing away from the first reflective stripe 151, the first group of light sources 110 is located at a side of the first reflective stripe 151 facing away from the light collecting device 170, and the second group of light sources 120 is located at a side of the second reflective stripe 152 facing away from the light collecting device 170.

It can be understood that the light collecting device 170 can be a light homogenizing rod and has high transmittance to the light emitted by the first group of light sources 110 and the second group of light sources 120, and an divergence angle of the light beam can be reduced through a diffusion effect of the light collecting device 170 on the light beam, so as to obtain a uniform light spot at a light beam exit of the light collecting device 170. Without doubt, the light collecting device 170 can also be any other suitable light homogenizing element.

In order to combine a plurality of light beams to achieve high-brightness laser light output, the above laser light combining device 100 adopts a following combination structure, as shown in FIG. 1, the first group of light sources 110 includes a plurality of first light source arrays 111, the second group of light sources 120 includes a plurality of second light source arrays 121, the plurality of first light source arrays 111 and the plurality of second light source arrays 121 are arranged symmetrically at two sides of the central axis of the reflective curved surface 110, each of the first reflective stripes 151 corresponds to one of the first light source arrays 111, and a plurality of first reflective stripes 151 are sequentially arranged in a staggered manner in the direction perpendicular to the emission optical axis of the first light source array 111, each of the second reflective stripes 152 corresponds to one of the second light source arrays 121, and a plurality of second reflective stripes 152 are sequentially arranged in a staggered manner in the direction perpendicular to the emission optical axis of the second light source array 121, the emission optical axis of the first light source array 151 and the emission optical axis of the second light source array 121 are both perpendicular to the central axis of the reflective curved surface 161, such that space occupied by the plurality of first light source arrays 111 and the second light source arrays 121 in a width direction of a light combining region can be reduced. However, it should be understood that, the number of the first light source array 111 and the number of the second light source array 121 and their positional relationship with respect to the reflective curved surface 161 in the present embodiment are merely examples and can be flexibly adjusted in actual applications.

The number of the first reflective stripes 151 and the number of the first light source arrays 111 can be equal, the number of the second reflective stripes 152 and the number of the second light source arrays 112 can be equal, and each of the reflective stripes is correspondingly located on the emission optical path of a light source array and reflects the light emitted by the light source array onto the reflective curved surface in a direction parallel to the central axis of the reflective curved surface 161, so as to ensure that the light beams emitted by the reflecting device 150 are condensed together, to realize the high-brightness laser light output.

In the laser light combining device 100 of the present embodiment, densely arranged light beams are generated by the first group of light sources 110 and the second group of light sources 120, the first reflective stripe 151 and the second reflective stripe 152 are configured to adjust transmission directions of the light beams, and high-brightness, uniform laser light beams can be finally obtained through the light condensing device 160 and the light collecting device 170. Since a plurality of light beams emitted by the respective light source arrays (such as the first light source array 111 and the second light source array 121) are approximately parallel and densely arranged, using each first reflective stripe 151 and each second reflective stripe 152 to reflect the light emitted by the at least one first light source array 111 and reflect the light emitted by the at least one second light source array 121 can make the entire laser light combining device 100 have a compact structure and a relatively small size on the basis of ensuring high-brightness output, and can also control the number of the first reflective stripes 151 and the second reflective stripes 152 to be within a relatively small range, thereby achieving technical effects such as simplified device structure and convenient assembly.

After a direction of the light emitted by the first light source array 111 is adjusted by the first reflective stripe 151 and a direction of the light emitted by the plurality of second light source arrays 121 are adjusted by the second reflective stripes 152, it can be irradiated on the reflective curved surface 161 along the direction parallel to the central axis of the reflective curved surface 161, and the reflective curved surface 161 is again used to adjust the transmission direction of the parallel light beams and compress and shape the parallel light beams, the respective light beams are condensed at the focal point of the reflective curved surface 161 and finally received by the light collecting device 170, for example, when the light collecting device 170 is a light homogenizing rod, and uniform laser light beams with high-brightness can be obtained. Further, in the laser light combining device 100, transmission paths of the light beams during the process of the light beam combining are all located in a region enclosed by the first group of light sources 110 and the second group of light sources 120, the parallel light beams overlap the condensed light beams condensed by the light condensing device 160, such that space of the light combining region in two directions—length and width—can be reused, a structural layout of the whole set of device is more compact, and more laser light sources can be accommodated, thereby achieving the high-brightness laser light output while reducing the size of the device.

In a modified embodiment, at least two first reflective stripes of the plurality of first reflective stripes 151 are connected into one piece by the first connecting portion 155, at least two second reflective stripes of the plurality of second reflective stripes 152 are connected into one piece by the second connecting portion 156, such that the plurality of first reflective stripes 151 and the plurality of second reflective stripes 152 can be more easily assembled and fixed.

Figure 4:
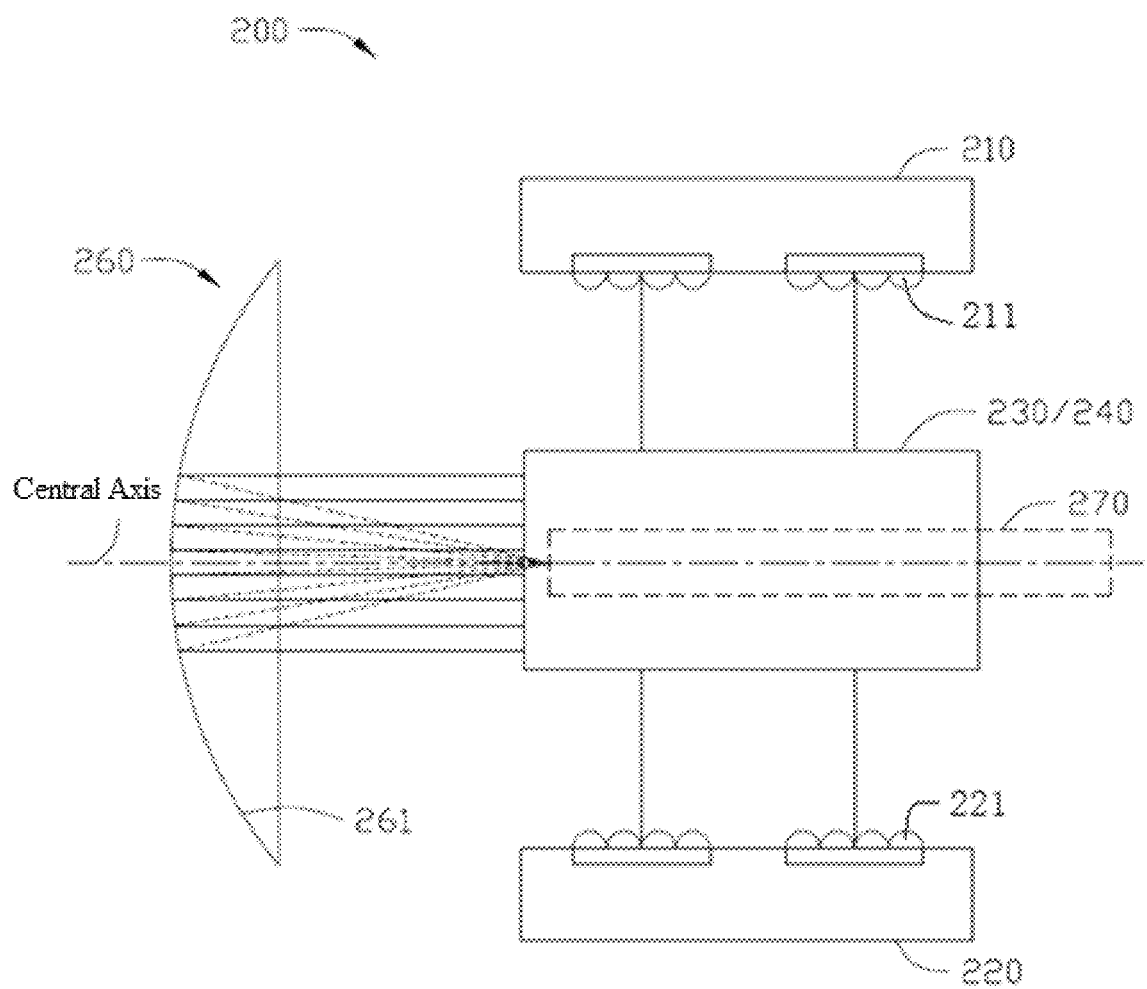
FIG. 4 is a schematic diagram of a laser light combining device according to a second embodiment of the present disclosure along a first direction.
Figure 5:
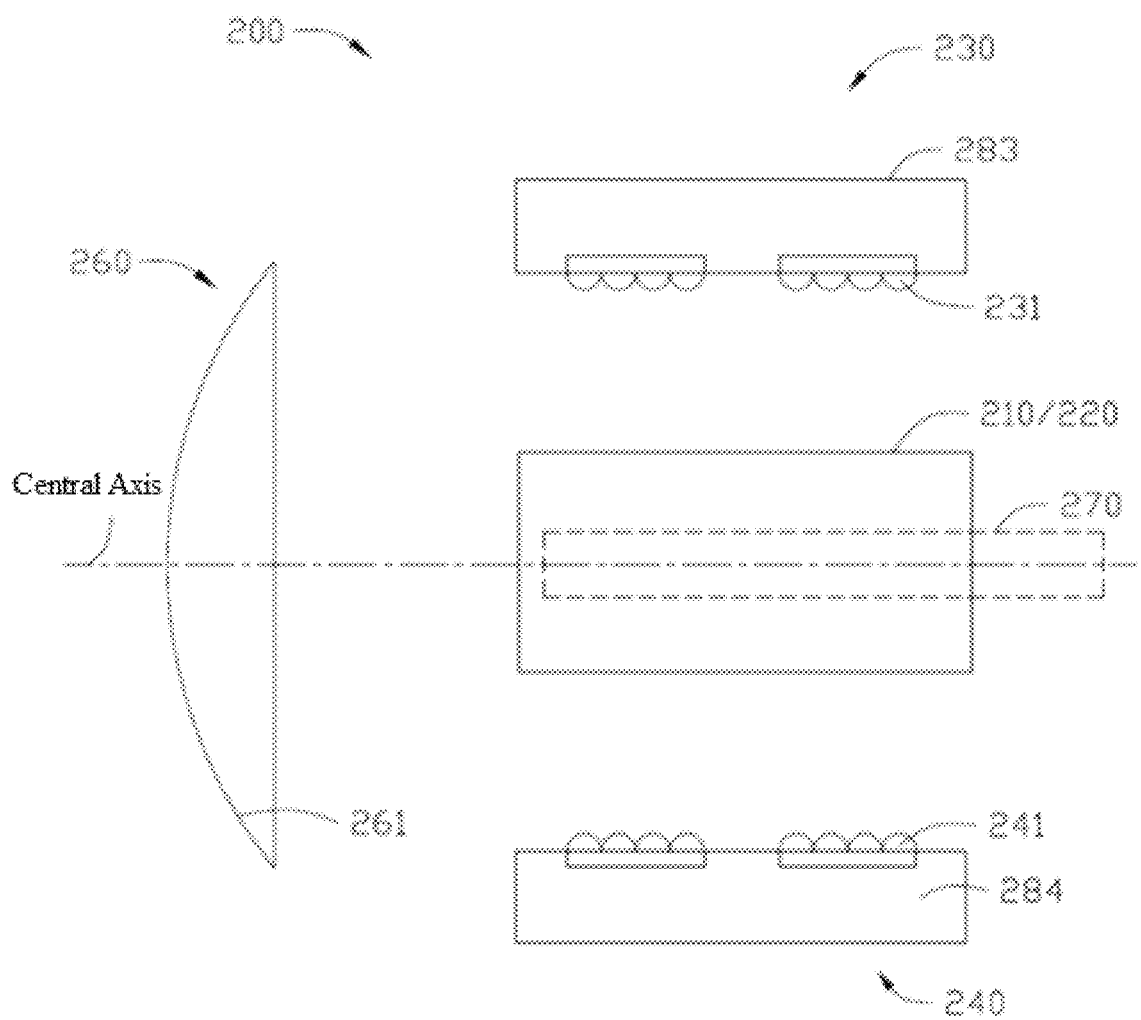
FIG. 5 is a schematic diagram of the laser light combining device shown in FIG. 4 along a second direction perpendicular to the first direction.
Figure 6:
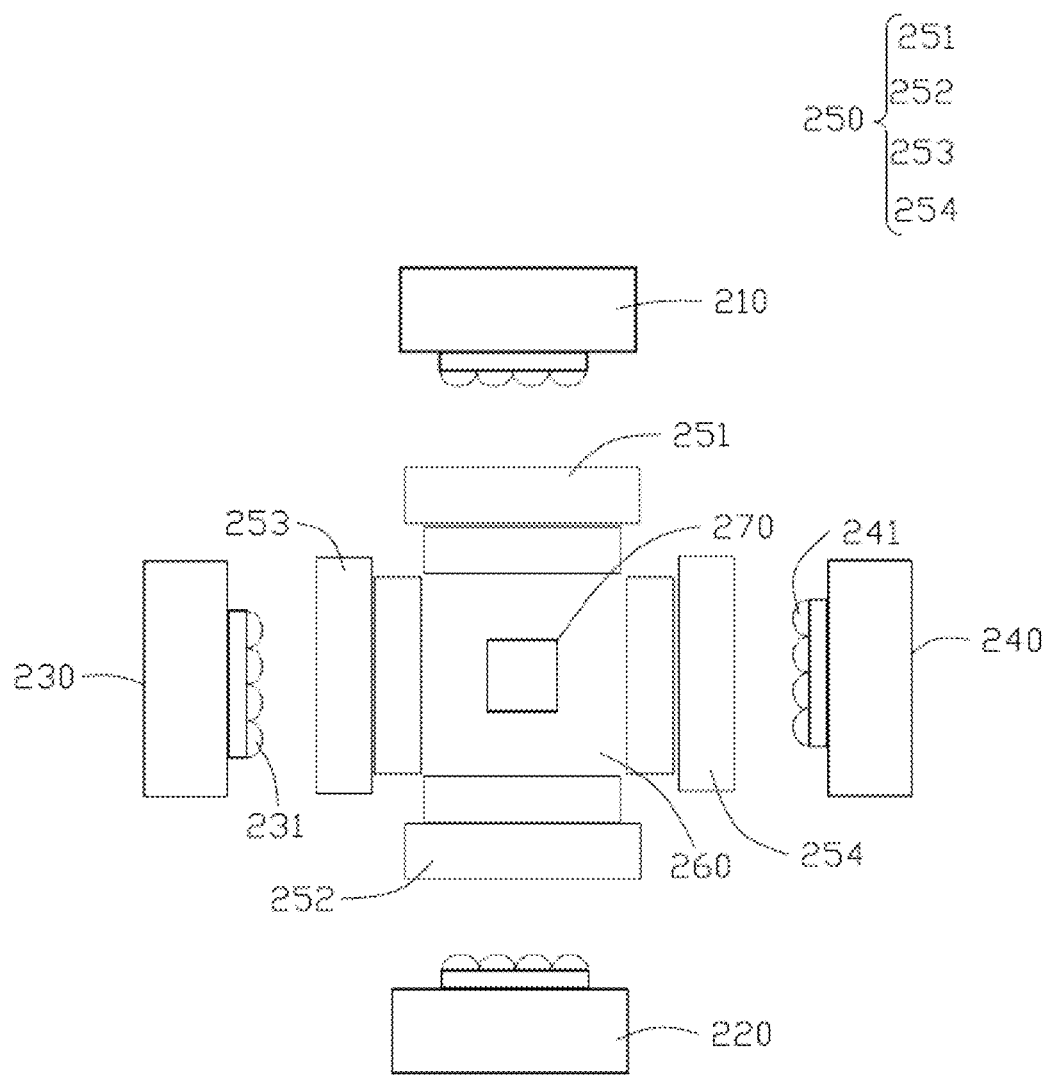
FIG. 6 is a schematic diagram of the laser light combining device shown in FIG. 4 along a third direction perpendicular to the first direction and the second direction.

Referring to FIG. 4, FIG. 5 and FIG. 6, FIG. 4 is a schematic view of the laser light combining device 200 according to the second embodiment of the present disclosure along a first direction, FIG. 5 is a schematic view of the laser light combining device 200 shown in FIG. 4 along a second direction perpendicular to the first direction, and FIG. 6 is a schematic view of the laser light combining device 200 shown in FIG. 4 along a third direction perpendicular to the first direction and the second direction. The laser light combining device 200 is substantially the same as the laser light combining device 100 provided in the first embodiment, that is to say, the above description of the laser light combining device 100 of the first embodiment can basically be applied to the laser light combining device 200 provided in the second embodiment. A difference between the two mainly lies in: the laser light combining device 200 of the second embodiment further includes a third group of light sources 230 and a fourth group of light sources 240, and the reflecting device 250 further includes a third reflective stripe 253 corresponding to the third group of light sources 230 and a fourth reflective stripe 254 corresponding to the fourth group of light sources 240.

In the second embodiment, structures of the first group of light sources 210, the second group of light sources 220, the first reflective stripe 251, the second reflective stripe 252, the light condensing device 260, and the light collecting device 270 are basically the same as structures of the first group of light sources 110, the second group of light sources 120, the first reflective stripe 151, the second reflective stripe 152, the light condensing device 160, and the light collecting device 170 in the first embodiment, respectively, and will not be repeated herein.

The third group of light sources 230 includes a third light source array 231, the fourth group of light sources 240 includes a fourth light source array 241, each third reflective stripe 253 corresponds to at least one third light source array 231 and is located on an emission optical path of the at least one third light source array 231, each third reflective stripe 253 is configured to reflect the light emitted by the at least one third light source array 231, each fourth reflective stripe 254 corresponds to at least one fourth light source array 241 and is located on an emission optical path of the at least one fourth light source array 241, and each fourth reflective stripe 254 is configured to reflect the light emitted by the at least one fourth light source array 241. The first, second, third, and fourth reflective stripes 251, 252, 253, and 254 are respectively located on four sides around the reflecting device 250, the first group of light sources 210, the second group of light sources 220, the third group of light sources 230, and the fourth group of light sources 240 respectively correspond to the first, second, third, and fourth reflective stripes 251, 252, 253, and 254 and are located in a periphery of the reflecting device 250, the first reflective stripe 251 is configured to reflect the light emitted by the first group of light sources 210 to combine light, the second reflective stripe 252 is configured to reflect the light emitted by the second group of light sources 220 to combine light, the third reflective stripe 253 is configured to reflect the light emitted by the second group of light sources 230 to combine light, and the fourth reflective stripe 254 is configured to reflect the light emitted by the fourth group of light sources 240 to combine light. The light reflected by the first, second, third, and fourth reflective stripes 251, 252, 253, and 254 are all guided to the light condensing device 260, and the light condensing device 260 is configured to condense the light emitted by the first, second, third and fourth reflective stripes 251, 252, 253, and 254 to the light collecting device 270.

It can be understood that the third light source array 231 and the fourth light source array 241 are both laser light source arrays and have a same structures as structures of the first light source array 211 and the second light source array 221, and for example, they can be the laser light source arrays shown in FIG. 2 and will not be repeated herein.

The number of the third light source array 231 is plural, the number of the third reflective stripe 251 is also plural, the plurality of third light source arrays 231 are in one-to-one correspondence to the plurality of third reflective stripes 251, emission optical axes of the plurality of third light source arrays 231 are staggered in parallel, the plurality of third reflective stripes 251 are arranged in a staggered manner as seen along a direction perpendicular to the emission optical axes of the plurality of third light source arrays 231, so that spaces between the light beams obtained after light emitted by the plurality of third light source arrays 231 is reflected are reduced, the plurality of third reflective stripes 253 reflects the light emitted by the third light source array 231 to combine light, and the light emitted by the plurality of third reflective stripes 253 is all guided to the light condensing device 260.

The number of the fourth light source array 241 is plural, the number of the fourth reflective stripe 254 is also plural, the plurality of fourth light source arrays 241 are in one-to-one correspondence to the plurality of fourth reflective stripes 254, emission optical axes of the plurality of fourth light source arrays 241 are staggered in parallel, the plurality of fourth reflective stripes 254 are arranged in a staggered manner as seen along the direction perpendicular to the emission optical axes of the plurality of fourth light source arrays 241, so that spaces between the light beams obtained after light emitted by the plurality of fourth light source arrays 241 is reflected are reduced, the plurality of fourth reflective stripes 254 reflects the light emitted by the fourth light source array 241 to combine light, and the light emitted by the plurality of fourth reflective stripes 254 is all guided to the light condensing device 260.

Further, the plurality of third reflective stripes 253 are sequentially arranged in a staggered manner as seen along a direction facing away from the light condensing device 260, and a distance between the third reflective stripe 253 and the corresponding third light source array 231 gradually decreases along the direction facing away from the light condensing device 260. The plurality of fourth reflective stripes 254 is sequentially arranged in a staggered manner as seen along the direction facing away from the light condensing device 260, and a distance between the fourth reflective stripe 254 and the corresponding fourth light source array 241 gradually decreases along the direction facing away from the light condensing device 260.

It can be understood that in an embodiment, lasers of the plurality of third light source arrays 231 can be disposed on the same base body, and lasers of the plurality of fourth light source arrays 241 can be disposed on the same base body. In another embodiment, the plurality of third light source arrays 231 can be disposed on the same water cooling plate 283, such that heat dissipation effects of the plurality of third light source arrays 231 are consistent, and thus brightness of the plurality of third light source arrays 231 is relatively consistent; the plurality of fourth light source arrays 241 can be disposed on the same water cooling plate 284, to make the heat dissipation effects of the plurality of fourth light source arrays 241 consistent, and then light emission brightness of the plurality of fourth light source arrays 241 is relatively consistent, so that final light emission of the laser light combining device 200 is more uniform.

Further, as shown in FIG. 4 to FIG. 6, the plurality of first light source arrays 211 and the second light source arrays 221 can be oppositely arranged, that is, the first group of light sources 210 and the second group of light sources 220 are oppositely arranged, the plurality of third light source arrays 231 and the fourth light source arrays 241 can be oppositely arranged, that is, the third group of light sources 230 is opposite to the fourth group of light sources 240, and the reflecting device 250 can be located between the first group of light sources 210 and the second group of light sources 220 and located between the third group of light sources 230 and the fourth group of light sources 240.

Same as the first reflective stripe 251 and the second reflective stripe 252, the third reflective stripe 253 and the fourth reflective stripe 254 can both be mirrors. Reflective surfaces of the third reflective stripe 253 and the fourth reflective stripe 254 are both planar surfaces, and the reflective surface of the third reflective stripe 253 can be at an angle of 45 degrees to the emission optical axis of the third light source array 231, such that the light of the third light source array 231 reflected by the third reflective stripe 253 is approximately at an angle of 90 degrees to the emission optical axis of the third light source array 231; the reflective surface of the fourth reflective stripe 254 can be at an angle of 45 degrees to the emission optical axis of the fourth light source array 241, so that the light of the fourth light source array 241 reflected by the fourth reflective stripe 254 is at an angle of approximately 90 degrees to the emission optical axis of the fourth light source array 241. In the present embodiment, the third light source arrays 231 and the fourth light source arrays 241 are oppositely arranged in one-to-one correspondence and light emission directions of the two are opposite to each other.

Further, similar to the structure shown in FIG. 3, in a modified embodiment, at least two third reflective stripes 253 of the plurality of third reflective stripes 253 are connected into one piece through a first connecting portion, and a direction in which the third connecting portion extends is substantially parallel to the direction of the light emitted by the third reflective stripe 253. At least two fourth reflective stripes 254 of the plurality of fourth reflective stripes 254 are connected into one piece through a fourth connecting portion, and a direction in which the fourth connecting portion extends is parallel to the direction along which the light is emitted by the fourth reflective stripe 254. It can be understood that it is convenient to assemble and fix the reflecting device 250 in the modified embodiment.

In the present embodiment, the light condensing device 260 receives the light emitted by the four groups of light sources 210, 220, 230, and 240 that are respectively reflected by the four reflective stripes 251, 252, 253, and 254, and condenses the light emitted by the four reflective stripes 251, 252, 253, and 254 to the light collecting device 270. The light collecting device 270 is located among the four reflective stripes 251, 252, 253, and 254, the four reflective stripes 251, 252, 253, and 254 are respectively located on four sides around the light collecting device 270 to surround the light collecting device 270, the light collecting device 270 is located at a center of a shape defined by the first, second, third and fourth reflective stripes 251, 252, 253, 254, and the four groups of light sources are respectively located on peripheries of the four reflective stripes 251, 252, 253, and 254 (such as four surrounding sides). It should be understood that the number and structure of the first, second, third, and fourth light source arrays 211, 221, 231, and 241 can be the same, the number and structure of the first, second, third, and fourth reflective stripes 251, 252, 253, and 254 can be the same but located in different positions, and the number and structure of the first, second, third, and fourth light source arrays 211, 221, 231, and 241, the number and structure of the first, second, third, and fourth reflective stripes 251, 252, 253, and 254 and their positional relationship with respect to the reflective curved surface are only examples and can be flexibly adjusted in practical applications.

The number of the third reflective stripe 253 and the number of the third light source array 231 can be equal, the number of the fourth reflective stripe 254 and the number of the fourth light source array 241 can be equal, each reflective stripe is correspondingly located an emission optical path of a light source array, to reflect the light emitted by the light source array onto the reflective curved surface 261 in a direction parallel to the central axis of the reflective curved surface 261, thereby ensuring that the light beams emitted by the first light are condensed together, to achieve high-brightness laser light output.

In the second embodiment, the respective reflective stripes 251, 252, 253, and 254 respectively change transmission directions of the densely arranged light beams emitted by the respective groups of light sources 210, 220, 230, and 240, so as to reduce the spaces between the light beams and combine light, and the combined light beam is reflected onto the reflective curved surface 261 along a direction substantially parallel to the central axis of the reflective curved surface 261 of the light condensing device 260, thereby ensuring that the light beams emitted by the first light are condensed together, to achieve high-brightness laser light output.

Figure 7:
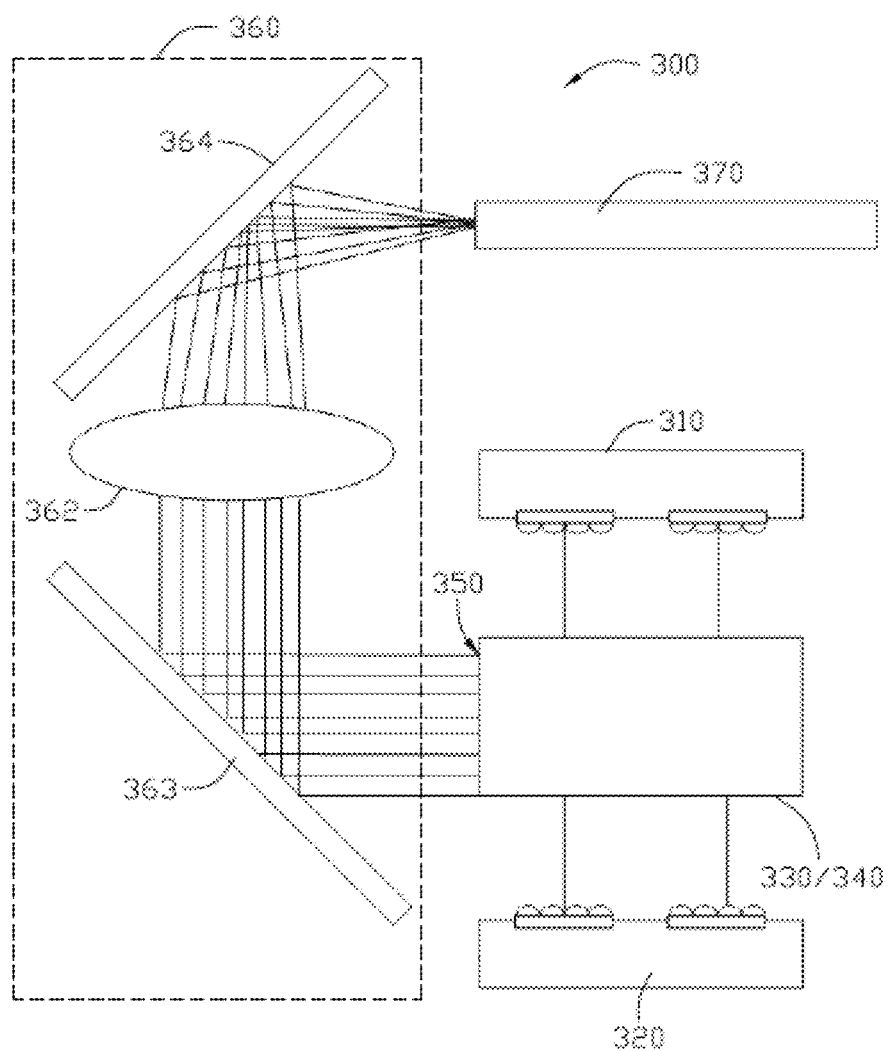
FIG. 7 is a schematic diagram of a laser light combining device according to a third embodiment of the present disclosure along a first direction.
Figure 8:
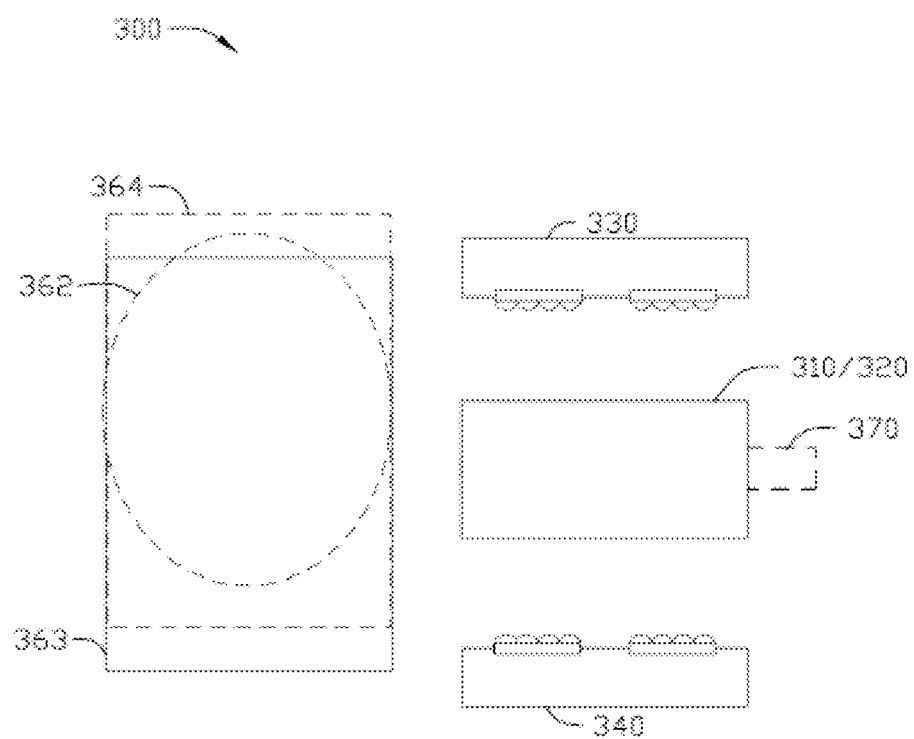
FIG. 8 is a schematic diagram of the laser light combining device shown in FIG. 7 along a second direction perpendicular to the first direction.

Referring to FIG. 7 and FIG. 8, FIG. 7 is a schematic view of a laser light combining device 300 according to a third embodiment of the present disclosure along a first direction, and FIG. 8 is a schematic view of the laser light combining device 300 shown in FIG. 7 along a second direction perpendicular to the first direction. The laser light combining device 300 is substantially the same as the laser light combining device 200 of the second embodiment, that is to say, the above description of the laser light combining device 200 of the second embodiment can basically be applied to the laser light combining device 300 of the third embodiment, and a difference between the two mainly lies in: the structure of the light condensing device 360 of the laser light combining device 300 and the position of the light collecting device 370 of the third embodiment are different from those provided in the second embodiment.

In the third embodiment, the light condensing device 360 includes a lens 362, a first mirror 363 and a second mirror 364, the first mirror 363 is configured to reflect the light emitted from the respective reflective stripe to the lens 362, the lens 362 is configured to condense the light emitted by the first mirror 363 and transmit it to the second mirror 364, and the second mirror 364 is configured to reflect the light condensed by the lens 362 so as to condense it to the light collecting device 370. A reflective surface of the first mirror 363 is perpendicular to a reflective surface of the second mirror 364, the light collecting device 370 is located at a side of one of the groups of light sources (such as the first group of light sources) adjacent to the second mirror 364 facing away from the reflecting device 350, and an optical axis of the light collecting device 370 is substantially parallel to the light emitted by the respective reflective stripe. The lens 362 can be a telephoto lens, and a specific focal length thereof can be selected according to actual needs.

In the third embodiment, the light beam combined by the reflecting device 350 can similarly be collected to the light collecting device 370 through the light condensing device 360 having different structures, to realize the laser light combining device 300 that has a compact structure, easy to assemble, high-brightness and uniformity on the basis of substantially not increasing the volume.

It can be understood that, in a modified embodiment of the third embodiment, according to actual needs, it is possible to only provide two groups of light sources and two types of reflective stripes (such as the first group of light sources 310, the second group of light sources 320, the first reflective stripes and the second reflective stripes), and omit the third group light source 330 and the fourth group light source 340, the third and fourth reflective stripes.

Figure 9:
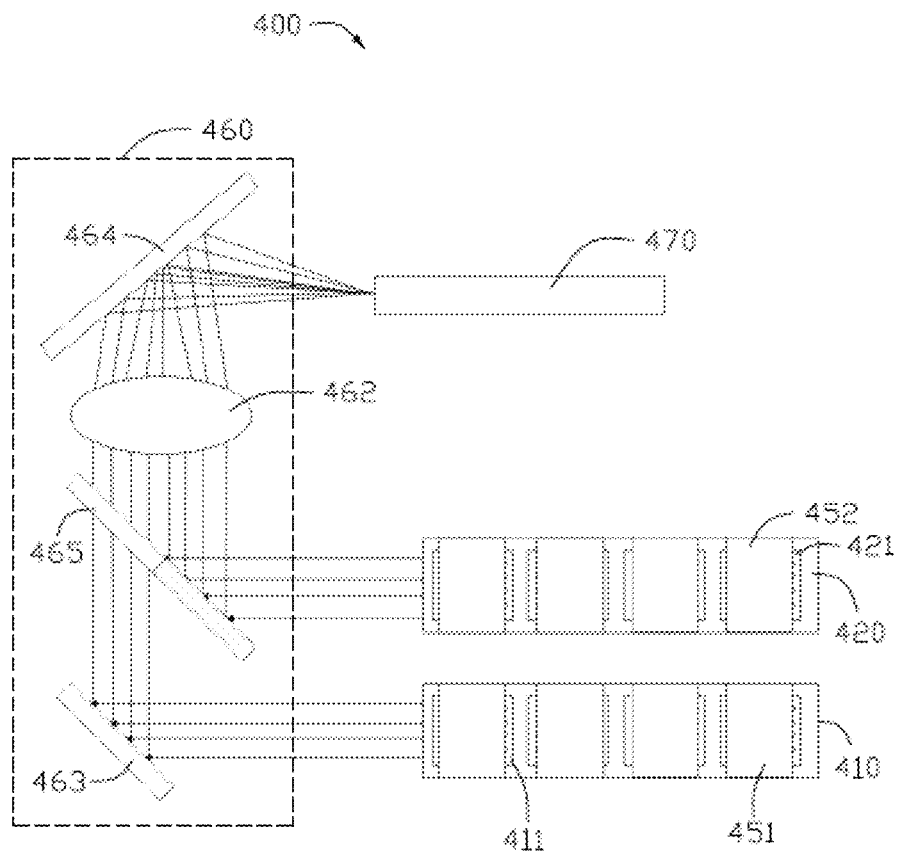
FIG. 9 is a schematic diagram of a laser light combining device according to a fourth embodiment of the present disclosure along a first direction.
Figure 10:
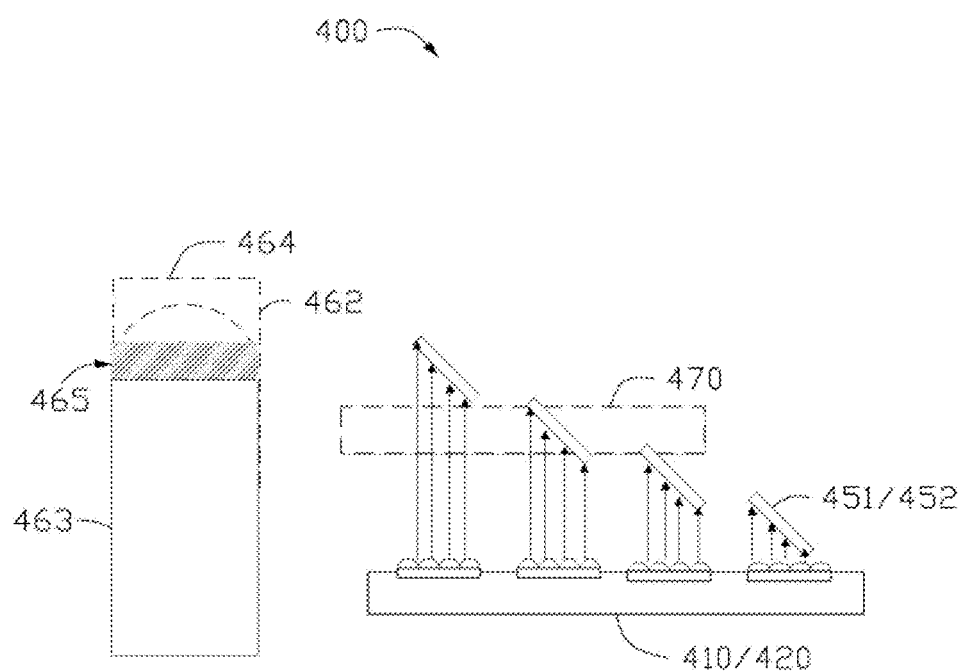
FIG. 10 is a schematic diagram of the laser light combining device shown in FIG. 9 along a second direction perpendicular to the first direction.

Referring to FIGS. 9 and 10, FIG. 9 is a schematic view of a laser light combining device 400 according to the fourth embodiment of the present disclosure along a first direction, and FIG. 10 is a schematic view of the laser light combining device 400 shown in FIG. 9 along a second direction perpendicular to the first direction. The laser light combining device 400 of the fourth embodiment is substantially the same as the laser light combining device 300 of the third embodiment, and a difference between the two mainly lies in: the number of light sources, the structure and position of each group of light sources, the position of each reflective stripe, and the structure of the light condensing device 460 of the laser light combining device 400 of the fourth embodiment are different from those of the third embodiment.

The laser light combining device 400 of the fourth embodiment includes a first group of light sources 410 and a second group of light sources 420, and structures of the first group of light sources 410 and the second group of light sources 420 can be the same as those of the first group of light sources 110 and the second group of light sources 120 in the first embodiment, which will not be repeated herein. In the present embodiment, the first group of light sources 410 and the second group of light sources 420 are arranged in parallel, and light emission axes of the first group of light sources 410 and the second group of light sources 420 can be parallel. A plurality of first reflective stripes 451 are located at a side of the first group of light sources 410, a plurality of second reflective stripes 452 are located at a side of the second group of light sources 410, and light reflected by the plurality of first reflective stripes 451 and light of the second reflective stripes 452 are substantially parallel and are all facing towards the light condensing device 460.

The light condensing device 460 further includes a lens 462, a first mirror 463, a second mirror 464 and a light combining device 465, the first mirror 463 is configured to reflect the light emitted by the first reflective stripe 451 to the light combining device 465, the light combining device 465 receives the light emitted by the first mirror 463 and the light emitted by the second reflective stripe 452 and guides combined light to the lens 462, the lens 462 is configured to condense the light emitted by the light combining device 465 and transmit it to the second mirror 464, and the second mirror 464 is configured to reflect the light condensed by the lens 462 so as to condense it to the light collecting device 470.

In the present embodiment, light emitted by the first light source array 411 has a first polarization state, light emitted by the second light source array 421 has a second polarization state, the light combining device 465 is a polarization-mode light combining device, and it transmits light having the first polarization state and reflects light having the second polarization state, so as to combine the light of the first light source array 411 and the light of the second light source array 421 and provide a combined light beam to the lens 462 for condensing. Same as the case in the third embodiment, the lens 462 can be a telephoto lens, and a specific focal length thereof can be selected according to actual needs.

Figure 11:
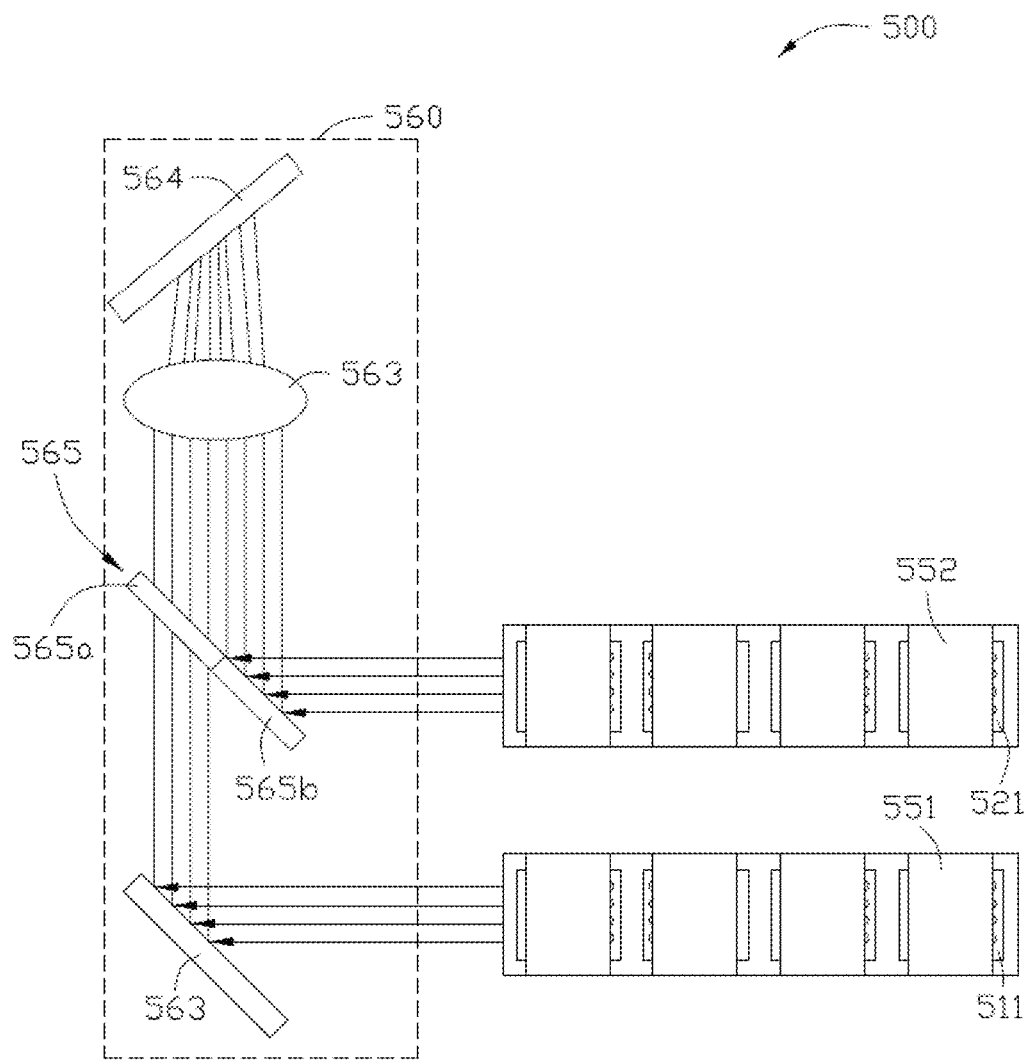
FIG. 11 is a schematic diagram of a laser light combining device according to a fifth embodiment of the present disclosure in a first direction.
Figure 12:
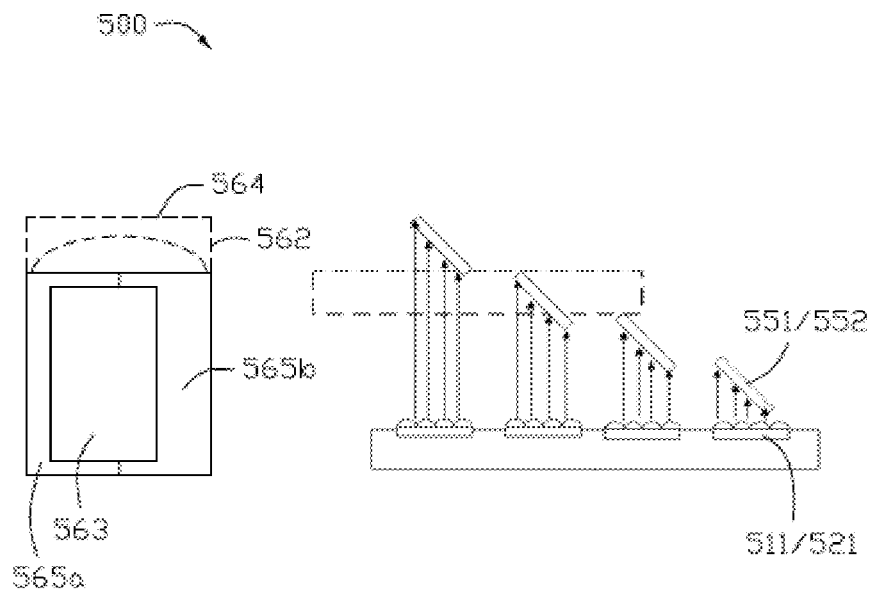
FIG. 12 is a schematic diagram of the laser light combining device shown in FIG. 10 along a second direction perpendicular to the first direction.

Referring to FIGS. 11 and 12, FIG. 11 is a schematic view of a laser light combining device 500 according to the fifth embodiment of the present disclosure along a first direction, and FIG. 12 is a schematic view of the laser light combining device 500 shown in FIG. 10 along a second direction perpendicular to the first direction. The laser light combining device 500 of the fifth embodiment is substantially the same as the laser light combining device 400 of the fourth embodiment, and a difference between the two mainly lies in: the structure of the light combining device 565 of the light condensing device 560 of the fifth embodiment is different.

The light combining device 565 includes a first region 565a and a second region 565b, the first region 565a receives the light emitted by the first mirror 563 (that is, the light of the first reflective stripe 551 reflected by the first mirror 563) and transmits the light emitted by the first mirror 563, the second region 565b receives the light emitted by the second reflective stripe 552 and reflects the light emitted by the second reflective stripe 552, so that the light combining device 565 combines the light emitted from the first reflective stripe 551 and the second reflective stripe 552 and provides a combined light beam to the lens 562. The first region 565a can be an anti-reflection (AR) film, the second region 565b can be a mirror, and the first region 565a and the second region can be spliced together.

In the fifth embodiment, since the light combining device 565 adopts region light-splitting (such as a structure in which the AR film and the mirror are spliced together), the light emitted by the first light source array 511 and the second light source array 521 can have no limitation on the polarization state, and subsequent use of the light of the laser light combining device 100 does not need to convert the polarization state.

Figure 13:
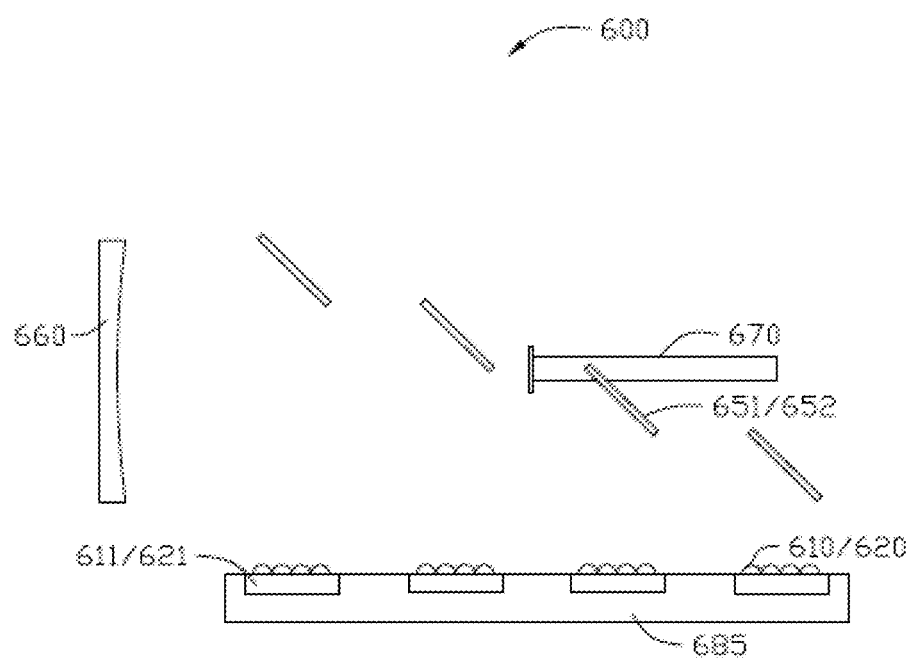
FIG. 13 is a schematic diagram of a laser light combining device according to a sixth embodiment of the present disclosure along a first direction.
Figure 14:
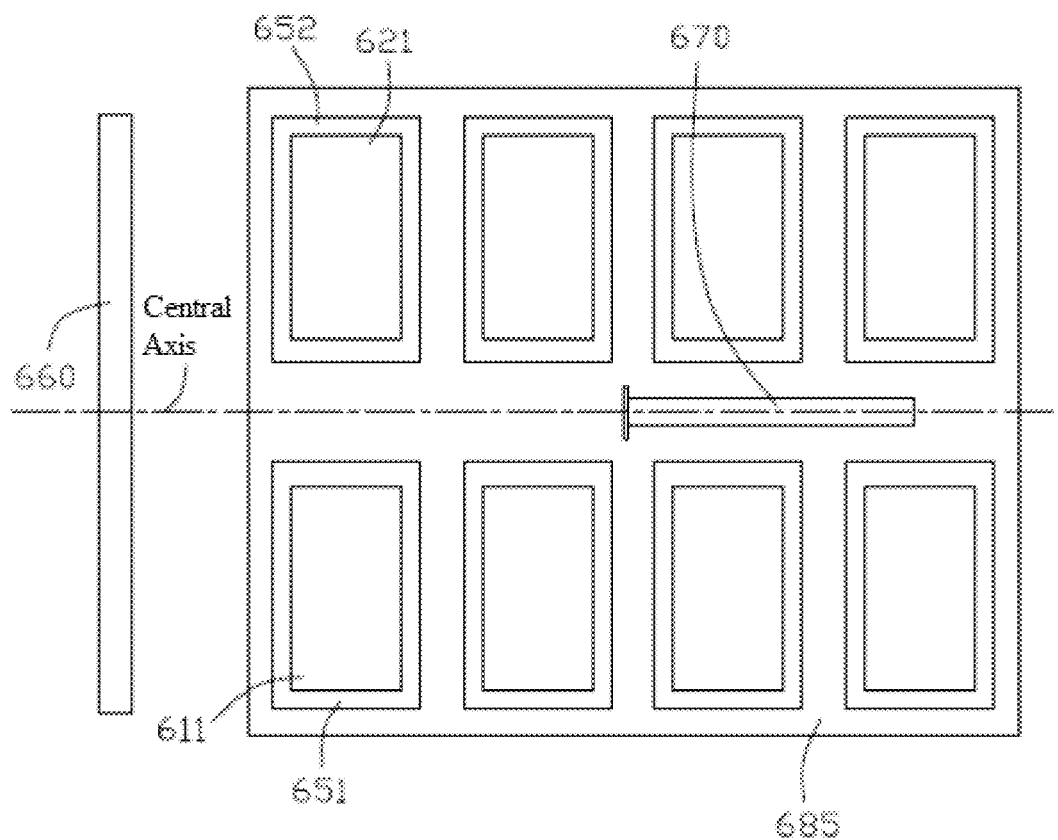
FIG. 14 is a schematic diagram of the laser light combining device shown in FIG. 13 along a second direction perpendicular to the first direction.

Referring to FIGS. 13 and 14, FIG. 13 is a schematic view of a laser light combining device 600 according to the sixth embodiment of the present disclosure along the first direction, and FIG. 14 is a schematic view of the laser light combining device 600 shown in FIG. 13 along a second direction perpendicular to the first direction. The laser light combining device 600 is substantially the same as the laser light combining device 100 provided in the first embodiment, that is to say, the above description of the laser light combining device 100 of the first embodiment can basically be applied to the laser light combining device 600 provided in the sixth embodiment, and a difference between the two mainly lies in: a structure and a position of a first group of light sources 610, a structure and a position of a second group of light sources 620, a position of a first reflective stripe 651, and a position of a second reflective stripe 652 are slightly different.

A first light source array 611 of the first group of light sources 610 and a second light source array 621 of the second group of light sources 620 are disposed at the same side of the same water cooling plate 685, and light emission axes of the first light source array 611 and the second light source array 621 can be parallel to each other, and light emission directions can be the same. The first reflective stripe 651 and the second reflective stripe 652 are both located at a side of the water cooling plate 685 where the first group of light sources 610 and the second group of light sources 611 are located. Structures of the first group of light sources 610 and the second group of light sources 611 can be the same, structures of the first reflective stripe 651 and the second reflective stripe 652 can be the same, in the present embodiment, when being viewed from a direction shown in FIG. 13, positions of the first reflective stripe 651 and the second reflective stripe 652 overlap. The light collecting device 670 is located between the first reflective stripe 651 and the second reflective stripe 652, and when being viewed from the direction shown in FIG. 13, positions of the first reflective stripe 651 and the second reflective stripe 652 can slightly overlap the position of the light collecting device 670.

The structure of the light condensing device 660 and the structure of the light collecting device 670 can be the same as the structure of the light condensing device 160 and the structure of the light collecting device 170 in the first embodiment, which will not be repeated herein.

In the sixth embodiment, the laser light combining device 600 uses the light condensing device 600, and the first reflective stripe 651, the second reflective stripe 652, and the light collecting device 670 are provided in space above the first group of light sources 610 and the second group of light sources 620, thereby making the entire laser light combining device 600 compact in structure and small in size on the basis of ensuring high-brightness output.

The present disclosure also provides a display apparatus, the display apparatus can be applied to projectors, liquid crystal display (LCD), etc., the display apparatus can include a laser light combining device, a spatial light modulator, and a projection lens, and the laser light combining device adopts the laser light combining device 100, 200, 300, 400, 500, and 600 in the above embodiment and the laser light combining device of modified embodiments thereof. The spatial light modulator is configured to modulate an image according to the light emitted by the laser light combining device and input image data so as to output image light, and the projection lens is configured to project according to the image light so as to display a projection image. The display apparatus adopting the laser light combining devices 100, 200, 300, 400, 500, and 600 of the above embodiments and the laser light combining apparatus of the modified embodiments thereof has technical effects such as high-brightness, compact structure, and relatively small size.

In addition, it can be understood that the laser light combining devices 100, 200, 300, 400, 500, and 600 in the above embodiments of the present disclosure and light source devices of the modified embodiments thereof can also be configured in stage lighting systems, vehicle-mounted lighting systems and surgery lighting system and the like but are not limited to the above display apparatuses.

What is claimed is:

1. A laser light combining device, comprising:
a first group of light sources comprising first light source arrays;
a second group of light sources comprising one or more second light source arrays;
a reflecting device comprising first reflective stripes and one or more second reflective stripes;
a light condensing device; and
a light collecting device,
wherein each of the first reflective stripes corresponds to at least one of the first light source arrays and is located on an emission optical path of the at least one of the first light source arrays and configured to reflect light emitted by the at least one of the first light source arrays;
wherein each of the one or more second reflective stripes corresponds to at least one of the one or more second light source arrays and is located on an emission optical path of the at least one of the one or more second light source arrays and configured to reflect light emitted by the at least one of the one or more second light source arrays;
wherein the light condensing device is configured to condense light emitted by the first reflective stripes and light emitted by the one or more second reflective stripes to the light collecting device;
wherein the light collecting device is configured to collect light condensed by the light condensing device and then emit the collected light;
wherein the light reflected by the first reflective stripes corresponding to the first light source arrays of the first group of light sources is staggered from each other along emission optical axes of the first light source arrays; and
wherein at least two first reflective stripes of the first reflective stripes are connected into one piece through a first connecting portion, and the first connecting portion extends in a direction parallel to light emitted by the first reflective stripes; and wherein at least two second reflective stripes of the plurality of second reflective stripes are connected into one piece through a second connecting portion, and the second connecting portion extends in a direction parallel to light emitted by the second reflective stripes.

2. The laser light combining device according to claim 1, wherein the first light source arrays correspond to first reflective stripes in one-to-one correspondence, and the emission optical axes of the first light source arrays are staggered in parallel, and wherein the first reflective stripes are arranged in a staggered manner as seen along a direction perpendicular to the emission optical axes of the first light source arrays, in such a manner that spaces between light beams obtained after light emitted by the first light source arrays is reflected are reduced; and
wherein the one or more second light source arrays comprise a plurality of second light source arrays, and the one or more second reflective stripes comprise a plurality of second reflective stripes, wherein the plurality of second light source arrays corresponds to the plurality of second reflective stripes in one-to-one correspondence, and emission optical axes of the plurality of second light source arrays are staggered in parallel, and wherein the plurality of second reflective stripes are arranged in a staggered manner as seen along a direction perpendicular to the emission optical axes of the plurality of second light source arrays, in such a manner that spaces between light beams obtained after light emitted by the plurality of second light source arrays is reflected are reduced.

3. The laser light combining device according to claim 1, further comprising:
a third group of light sources comprising one or more third light source arrays; and
a fourth group of light sources comprising one or more fourth light source arrays,
wherein the reflecting device further comprises one or more third reflective stripes and one or more fourth reflective stripes, wherein each of the one or more third reflective stripes is configured to reflect light emitted by at least one of the one or more third light source arrays, and each of the one or more fourth reflective stripes is configured to reflect light emitted by at least one of the one or more fourth light source arrays,
wherein the first reflective stripes, the one or more second reflective stripes, the one or more third reflective stripes and the one or more fourth reflective stripes are located on four sides around the reflecting device, respectively,
wherein the first group of light sources, the second group of light sources, the third group of light sources, and the fourth group of light sources are located on a periphery of the reflecting device and correspond to the first reflective stripes, the one or more second reflective stripes, the one or more third reflective stripes and the one or more fourth reflective stripes, respectively,
wherein the first reflective stripes, the one or more second reflective stripes, the one or more third reflective stripes and the one or more fourth reflective stripes are configured to reflect light emitted by the first group of light sources, light emitted by the second group of light sources, light emitted by the third group of light sources and light emitted by the fourth group of light sources, respectively, in order for light combination, and
wherein the light condensing device is configured to condense light emitted by the first reflective stripes, light emitted by the one or more second reflective stripes, light emitted by the one or more third reflective stripes and light emitted by the one or more fourth reflective stripes to the light collecting device.

4. The laser light combining device according to claim 3, wherein the one or more third light source arrays comprise a plurality of third light source arrays, and the one or more third reflective stripes comprise a plurality of third reflective stripes, wherein the plurality of third light source arrays corresponds to the plurality of third reflective stripes in one-to-one correspondence, and emission optical axes of the plurality of third light source arrays are staggered in parallel, and wherein the plurality of third reflective stripes are arranged in a staggered manner as seen along a direction perpendicular to the emission optical axes of the plurality of third light source arrays, in such a manner that spaces of light beams obtained after light emitted by the plurality of third light source arrays is reflected are reduced; and
wherein the one or more fourth light source arrays comprise a plurality of fourth light source arrays, and the one or more fourth reflective stripes comprise a plurality of fourth reflective stripes, wherein the plurality of fourth light source arrays corresponds to the plurality of fourth reflective stripes in one-to-one correspondence, and emission optical axes of the plurality of fourth light source arrays are staggered in parallel, and wherein the plurality of fourth reflective stripes are arranged in a staggered manner as seen along a direction perpendicular to the emission optical axes of the plurality of fourth light source arrays, in such a manner that spaces of light beams obtained after light emitted by the plurality of fourth light source arrays is reflected are reduced.

5. The laser light combining device according to claim 1, wherein the light condensing device comprises a reflective curved surface having a central axis, wherein the light collecting device is located on the central axis, the reflective curved surface is configured to condense received light to an incidence surface of the light collecting device, and the light collecting device is configured to guide light to exit in a direction facing away from the reflective curved surface.

6. The laser light combining device according to claim 5, wherein the reflective stripes are located on a periphery of the light collecting device to surround the light collecting device, the light collecting device is located at a center of the reflective stripes, and the groups of light sources are located on a periphery of the reflective stripes.

7. The laser light combining device according to claim 1, wherein the light condensing device comprises a lens, a first mirror and a second mirror, wherein the first mirror is configured to reflect light emitted from each reflective stripe to the lens, the lens is configured to condense light emitted by the first mirror and transmit the condensed light to the second mirror, and the second mirror is configured to reflect the light condensed by the lens so that the light is condensed to the light collecting device.

8. The laser light combining device according to claim 7, wherein a reflective surface of the first mirror is perpendicular to a reflective surface of the second mirror, and the light collecting device is located at a side, facing away from the reflecting device, of one of the groups of light sources adjacent to the second mirror, and an optical axis of the light collecting device is parallel to light emitted by each reflective stripe.

9. The laser light combining device according to claim 1, wherein the light condensing device further comprises a lens, a first mirror, a second mirror and a light combining device, wherein the first mirror is configured to reflect the light emitted by the first reflective stripes to the light combining device, the light combining device is configured to receive light emitted by the first mirror and light emitted by the one or more second reflective stripes and guide combined light to the lens, the lens is configured to condense the light emitted from the light combining device and transmit the condensed light to the second mirror, and the second mirror is configured to reflect the light condensed by the lens so that the light is condensed to the light collecting device.

10. The laser light combining device according to claim 9, wherein light emitted by the first light source arrays has a first polarization state, light emitted by the one or more second light source arrays has a second polarization state, the light combining device is a polarization-mode light combining device, and the light combining device is configured to transmit the light having the first polarization state and reflect the light having the second polarization state.

11. The laser light combining device according to claim 9, wherein the light combining device has a first region and a second region, the first region is configured to receive the light emitted by the first reflective stripes and then reflected by the first mirror and transmit the light emitted by the first mirror, and the second region is configured to receive the light emitted by the one or more second reflective stripes and reflect the light emitted by the one or more second reflective stripes.

12. The laser light combining device according to claim 9, wherein a reflective surface of the first mirror is perpendicular to a reflective surface of the second mirror, and the light collecting device is located at a side, facing away from the reflecting device, of one of the groups of light sources adjacent to the second mirror, and an optical axis of the light collecting device is parallel to light emitted by each reflective stripe.

13. The laser light combining device according to claim 1, wherein the first light source arrays of the first group of light sources and the one or more second light source arrays of the second group of light sources are arranged at a same side of one water cooling plate of at least one water cooling plate, the first reflective stripes and the one or more second reflective stripes are located at a side of the water cooling plate where the first group of light sources and the second group of light sources are located, and the light collecting device is located between the first reflective stripes and the one or more second reflective stripes.

14. A display apparatus comprising a light source, wherein the light source adopts a laser light combining device; and
wherein the laser light combining device comprises:
a first group of light sources comprising first light source arrays;
a second group of light sources comprising one or more second light source arrays;
a reflecting device comprising first reflective stripes and second reflective stripes;
a light condensing device; and
a light collecting device,
wherein each of the first reflective stripes corresponds to at least one of the first light source arrays and is located on an emission optical path of the at least one of the first light source arrays and configured to reflect light emitted by the at least one of the first light source arrays;
wherein each of the one or more second reflective stripes corresponds to at least one of the one or more second light source arrays and is located on an emission optical path of the at least one of the one or more second light source arrays and configured to reflect light emitted by the at least one of the one or more second light source arrays;
wherein the light condensing device is configured to condense light emitted by the first reflective stripes and light emitted by the one or more second reflective stripes to the light collecting device;
wherein the light collecting device is configured to collect light condensed by the light condensing device and then emit the collected light;
wherein the light reflected by the first reflective stripes corresponding to the first light source arrays of the first group of light sources is staggered from each other along emission optical axes of the first light source arrays; and
wherein at least two first reflective stripes of the first reflective stripes are connected into one piece through a first connecting portion, and the first connecting portion extends in a direction parallel to light emitted by the first reflective stripes; and wherein at least two second reflective stripes of the plurality of second reflective stripes are connected into one piece through a second connecting portion, and the second connecting portion extends in a direction parallel to light emitted by the second reflective stripes.

15. The display apparatus according to claim 14, wherein the first light source arrays correspond to the first reflective stripes in one-to-one correspondence, and the emission optical axes of the first light source arrays are staggered in parallel, and wherein the first reflective stripes are arranged in a staggered manner as seen along a direction perpendicular to the emission optical axes of the first light source arrays, in such a manner that spaces between light beams obtained after light emitted by the first light source arrays is reflected are reduced; and wherein the one or more second light source arrays comprise a plurality of second light source arrays, and the one or more second reflective stripes comprise a plurality of second reflective stripes, wherein the plurality of second light source arrays corresponds to the plurality of second reflective stripes in one-to-one correspondence, and emission optical axes of the plurality of second light source arrays are staggered in parallel, and wherein the plurality of second reflective stripes are arranged in a staggered manner as seen along a direction perpendicular to the emission optical axes of the plurality of second light source arrays, in such a manner that spaces between light beams obtained after light emitted by the plurality of second light source arrays is reflected are reduced.

16. The display apparatus according to claim 14, wherein the laser light combining device further comprises:

a third group of light sources comprising one or more third light source arrays; and a fourth group of light sources comprising one or more fourth light source arrays, wherein the reflecting device further comprises one or more third reflective stripes and one or more fourth reflective stripes, wherein each of the one or more third reflective stripes is configured to reflect light emitted by at least one of the one or more third light source arrays, and each of the one or more fourth reflective stripes is configured to reflect light emitted by at least one of the one or more fourth light source arrays, wherein the first reflective stripes, the one or more second reflective stripes, the one or more third reflective stripes and the one or more fourth reflective stripes are located on four sides around the reflecting device, respectively, wherein the first group of light sources, the second group of light sources, the third group of light sources, and the fourth group of light sources are located on a periphery of the reflecting device and correspond to the first reflective stripes, the one or more second reflective stripes, the one or more third reflective stripes and the one or more fourth reflective stripes, respectively, wherein the first reflective stripes, the one or more second reflective stripes, the one or more third reflective stripes and the one or more fourth reflective stripes are configured to reflect light emitted by the first group of light sources, light emitted by the second group of light sources, light emitted by the third group of light sources and light emitted by the fourth group of light sources, respectively, in order for light combination, and wherein the light condensing device is configured to condense light emitted by the first reflective stripes, light emitted by the one or more second reflective stripes, light emitted by the one or more third reflective stripes and light emitted by the one or more fourth reflective stripes to the light collecting device.

17. The display apparatus according to claim 16, wherein the one or more third light source arrays comprise a plurality of third light source arrays, and the one or more third reflective stripes comprise a plurality of third reflective stripes, wherein the plurality of third light source arrays corresponds to the plurality of third reflective stripes in one-to-one correspondence, and emission optical axes of the plurality of third light source arrays are staggered in parallel, and wherein the plurality of third reflective stripes are arranged in a staggered manner as seen along a direction perpendicular to the emission optical axes of the plurality of third light source arrays, in such a manner that spaces of light beams obtained after light emitted by the plurality of third light source arrays is reflected are reduced; and wherein the one or more fourth light source arrays comprise a plurality of fourth light source arrays, and the one or more fourth reflective stripes comprise a plurality of fourth reflective stripes, wherein the plurality of fourth light source arrays corresponds to the plurality of fourth reflective stripes in one-to-one correspondence, and emission optical axes of the plurality of fourth light source arrays are staggered in parallel, and wherein the plurality of fourth reflective stripes are arranged in a staggered manner as seen along a direction perpendicular to the emission optical axes of the plurality of fourth light source arrays, in such a manner that spaces of light beams obtained after light emitted by the plurality of fourth light source arrays is reflected are reduced.

18. The display apparatus according to claim 14, wherein the light condensing device comprises a reflective curved surface having a central axis, wherein the light collecting device is located on the central axis, the reflective curved surface is configured to condense received light to an incidence surface of the light collecting device, and the light collecting device is configured to guide light to exit in a direction facing away from the reflective curved surface.

* * * * *